Sept. 15, 1931.                R. C. ALLEN                1,823,309
                            ELASTIC FLUID TURBINE
                            Filed May 23, 1929
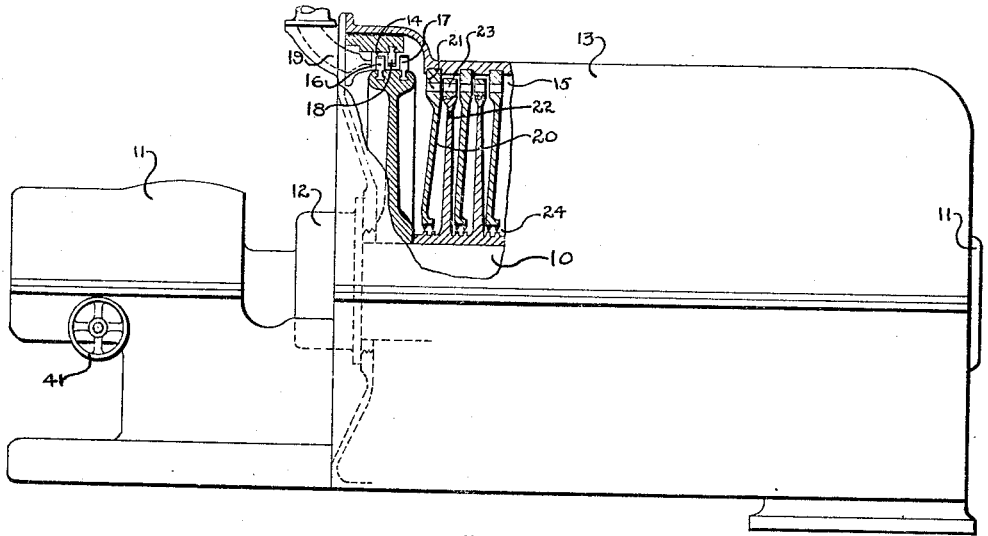
Fig. 1.
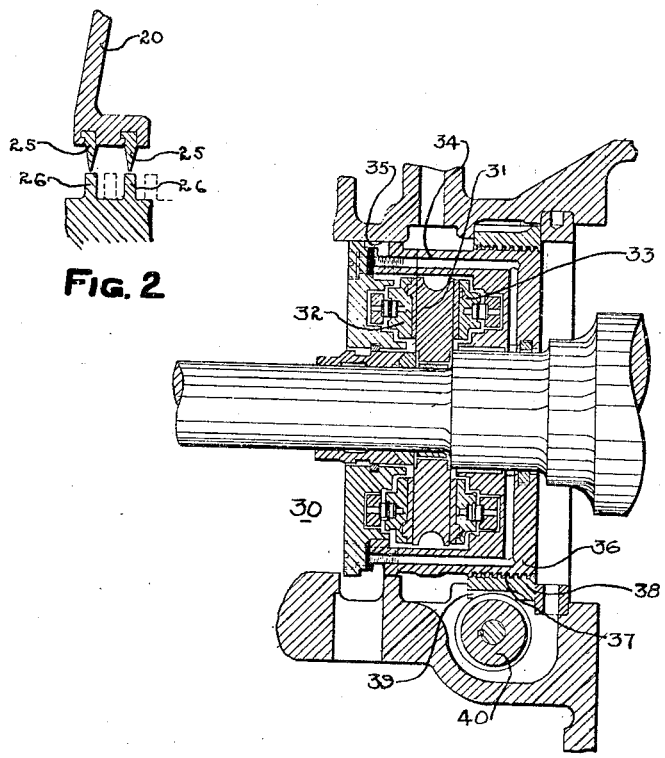
Fig. 2.
Fig. 3.
WITNESS
E. Lutz
INVENTOR
R.C. ALLEN.
BY
a. B. Reavis
ATTORNEY Patented Sept. 15, 1931 1,823,309

UNITED STATES PATENT OFFICE

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA

ELASTIC FLUID TURBINE

Application filed May 23, 1929. Serial No. 365,482.

My invention relates to elastic fluid turbines, more particularly those of the fractional expansion type, and it has for its object to provide large radial clearances between cooperating packing elements in starting and stopping, and close clearances when the turbine is in normal operation.

Increase in efficiency of turbines of the impulse type, more particularly of the Rateau type, where expansion takes place in nozzle passages provided in diaphragms, calls for shafts or spindles which are longer and of smaller diameter. As the spindle or rotor must pass through one or more critical speeds before reaching normal speed, whipping takes place and the diaphragm packing is likely to be injured unless relatively wide clearances are provided.

It is, therefore, a more particular object of my invention to provide a turbine of this type, having a rotor which is adjustable axially with respect to the stator so that, in starting and in coming up to normal speed, clearances sufficiently large may exist in the diaphragm packing so as to avoid injury incident to whipping; and, after normal speed is attained, the rotor is adjusted axially relatively to the stator to normal running position where very close clearances exist in the diaphragm packing.

These and other objects are effected by my invention, as will be apparent from the following specification and claim taken in connection with the accompanying drawings, forming a part of this application; in which:

Fig. 1 is a view, partly in longitudinal section and partly in elevation, of a turbine having my improvement applied thereto;

Fig. 2 is a detail view, drawn on a larger scale, of one of the diaphragm packing elements shown in Fig. 1; and, Fig. 3 is a sectional detail view of a rotor-shifting thrust bearing.

Referring now to the drawings more in detail for a better understanding of my invention, I show a turbine having a rotor including a shaft or spindle 10 carried by bearings 11, and extending through the glands 12 into the housing or cylinder 13.

The spindle 10 supports suitable energy-abstracting elements which cooperate with elements carried by the cylinder or housing. In Fig. 1, I show the first stage, at 14, of the customary two-row impulse type while the following stages, at 15, are of the single row impulse type. The first stage, at 14, consists of moving rows of blades 16 and 17 with an intervening row of stationary reversing blades 18, steam being supplied to the first row of moving blades 16 by suitable nozzle means 19. Referring to the succeeding pressure stages, each comprised by a diaphragm element 20 having nozzle passages 21 and a disc element 22 having blades 23, these are substantially the same in principle and no further description is necessary except that these stages are preferably of the Rateau type, that is, the nozzle passages 21 are so formed that relatively small pressure drops or expansions take place therein.

With a turbine of this type, it will be noted that all of the moving blades are carried by disc elements, which, in turn, are mounted upon the spindle or shaft 10, and that each of the diaphragms 20 is provided with packing, at 24, to restrict the leakage of motive fluid from the high pressure side to the low pressure side of the diaphragm. As shown in Fig. 2, each diaphragm 20 is provided with packing elements 25, which are arranged, in normal running position of the rotor, in opposed relation with respect to packing elements 26 carried by the spindle, the pairs of packing elements 25 and 26 being spaced apart sufficiently in an axial direction to permit the elements 25 and 26 being off-set laterally so that they will not be in opposition, thereby providing for a relatively much larger clearance in the packing.

For example, if the elements 26 in Fig. 2 were moved to the right to the position indicated by the dotted lines, the right-hand element 25 would be over the space between the elements 26, in which relative position, there would be considerable clearance in a radial direction between the peripheral edges of the packing elements and the opposed constructions.

In effecting the arrangement of the packing elements to provide the large radial clearances, the axial clearances between the stationary and rotor parts are designed to permit the rotor to be moved from normal running position, in one direction or the other, to an extent necessary to bring the packing element from position of close radial packing clearances to position of large clearances. For example, this may be accomplished in the construction shown in Fig. 1 by providing axial clearances between the right-hand side of the discs 22 and the left-hand side of the diaphragms 20 which permit movement of the rotor to the right from the normal running position thereof, at which the packing elements are disposed as shown in full lines in Fig. 2, to the position at which the packing elements are disposed as shown in dotted lines.

It will, therefore, be seen that the diaphragm packing indicated, at 24, is capable of adjustment, that is, in one axial position of the spindle, a minimum clearance is defined and, in the other axial position of the spindle, maximum clearance is defined. This feature is particularly desirable with a turbine where the spindle is relatively long, of small diameter, and is provided with many discs; these features making the operation complex in coming up to a relatively high speed, that is, one or more critical speeds will have to be passed through. If there were no capability of axial adjustment of the spindle and a critical speed should be passed through, it will be apparent that whipping of the spindle would likely result in injury to the diaphragm packing, and particularly so if the latter defines reasonably close clearances.

In order to preserve very close clearances in the diaphragm packing, when the turbine is running at normal speed, I provide packing of the character just referred to, a spindle which is shiftable axially relative to the stator, and mechanism for shifting the spindle. In starting up and in coming up to normal speed, the spindle would be adjusted axially to such a position that the various diaphragm packings define large clearances so as to avoid the possibility of rubbing or injury to the packing; and, when normal speed is attained, the spindle is shifted axially so that the pairs of packing elements of the diaphragms come into opposed relation thereby defining minimum clearances.

Referring now to the apparatus for shifting the spindle, any suitable means may be used for this purpose. However, by way of example, I show a thrust bearing indicated generally, at 30, which includes cooperating elements carried by the spindle and by the stator structures. Preferably, the thrust bearing includes a collar 31 carried by the spindle and opposed thrust elements 32 and 33, which are carried by a housing 34 cooperating with the opposite sides of the collar 31. The housing 34 is movable in an axial guide 35 provided by the stator structure and it is provided with a thread 36 at one end which cooperates with the thread 37 carried by a ring 38 rotatable in and restrained from axial movement with respect to the stator structure. The ring 38 has a peripheral worm wheel portion 39 meshing with the worm 40, the other end of the worm having connected thereto an operating member 41. By turning the operating member, the thrust bearing may be shifted longitudinally with respect to the stator structure carrying the spindle with it; and, in this way, the various packing elements may be caused to occupy either the position of wide clearance when starting and coming up to a speed or a position of fine clearance when operating at normal speed.

From the foregoing, it will be apparent that I have provided an impulse turbine with means whereby the destructive or injurious effects of whipping on the diaphragm packing may be avoided, it being necessary merely to shift the spindle to increase the packing clearance in starting and coming up to speed and while passing through the critical speed or speeds. When normal speed is reached, the spindle is shifted so that the packing defines minimum clearance. Therefore, my turbine has the characteristic of one having very wide clearances when coming up to speed and one which has very fine clearances when operating at normal speed.

Therefore, a turbine of this character has its efficiency very much increased due to the close packing clearances permitted by this arrangement and the features of construction, as the possibility of injury to the packing, when such injury is ordinarily likely to take place, is avoided.

While I have described my invention with particular reference to a turbine of the diaphragm-disc type having interstage packing between the spindle and the diaphragms, it will be apparent that my invention is not so limited, but may be applied to any type of turbine having radial packing elements, inasmuch as practically all elastic fluid turbines are subjected to more or less distortion due to temperature conditions in starting and stopping.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claim.

What I claim is:

In an elastic fluid turbine, the combination of a casing, a rotor, said rotor including a shaft and blade-carrying discs mounted thereon, diaphragms carried by said casing and interleaving with said discs, said diaphragms and discs being arranged with axial clearances permitting limited axial movement of the rotor relative to the casing, and cooperating radially-extending packing elements carried by the diaphragm and the shaft, said packing elements being in registry in end-to-end relation and providing radial packing clearances when the rotor is in one axial position within its limited axial movement and being out of registry when the rotor is in another axial position within its limited axial movement, the packing elements being axially spaced sufficiently to permit interleaving of the packing elements upon radial deflection of the shaft while in the second mentioned axial position, a thrust bearing determining the axial position of said rotor, and means for adjusting said thrust bearing to bring the rotor to either of said axial positions, whereby said packing elements may provide close radial packing clearances during normal operation of the turbine and be placed out of registry to provide large clearances while starting said turbine so as to avoid rubbing incident to whipping of the shaft while the rotor is passing through a critical speed.

In testimony whereof, I have hereunto subscribed my name this 16th day of May, 1929.

ROBERT C. ALLEN.